Figure 6:
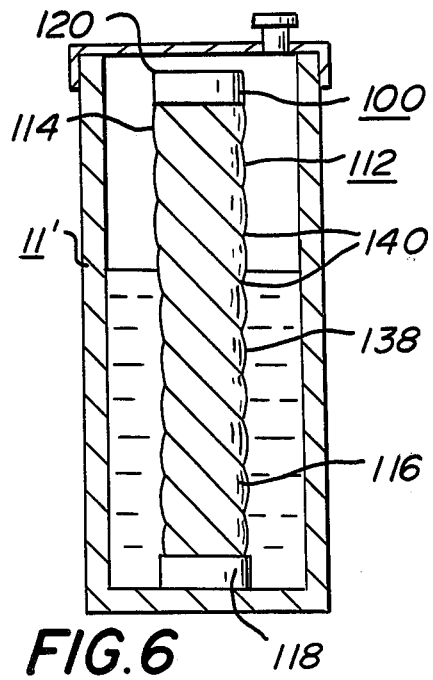

United States Patent [19]

Merz

[11] 4,311,048
[45] Jan. 19, 1982

[54] LIQUID LEVEL SENSING MEANS
[75] Inventor: Kenneth M. Merz, Gladwyne, Pa.
[73] Assignee: TRW, Inc., Cleveland, Ohio
[21] Appl. No.: 123,388
[22] Filed: Feb. 21, 1980
[51] Int. Cl.³ .............................................. G01F 23/28
[52] U.S. Cl. ....................................... 73/293; 116/227
[58] Field of Search .......................... 73/293; 116/227; 250/577

[56] References Cited

U.S. PATENT DOCUMENTS

| | | | |
|---|---|---|---|
| 2,190,027 | 2/1940 | Jordan | 116/227 |
| 2,686,428 | 8/1954 | Erikson | 73/293 |
| 3,068,697 | 12/1962 | Carlson | 73/293 |
| 3,417,614 | 12/1968 | Ryder | |
| 3,448,616 | 6/1969 | Wostl et al. | 73/293 |
| 3,834,235 | 9/1974 | Bouton et al. | 73/293 |
| 3,995,168 | 11/1976 | Neuscheler et al. | 73/293 X |
| 4,038,650 | 7/1977 | Evans et al. | 73/293 X |
| 4,039,845 | 8/1977 | Oberhänsli et al. | 73/293 X |
| 4,082,959 | 4/1978 | Nakashima | 73/293 X |

FOREIGN PATENT DOCUMENTS 2804639  8/1979  Fed. Rep. of Germany ........ 73/293

*Primary Examiner*—Charles A. Ruehl
*Assistant Examiner*—Joseph W. Roskos
*Attorney, Agent, or Firm*—Jacob Trachtman

[57] ABSTRACT

A liquid level sensing means for providing a continuous indication of liquid level or liquid content of a container comprising an elongated light conducting element adapted for being received into a liquid having first and second ends and a surface which provides an interface with the liquid for measuring liquid levels between the ends of the conducting element. A source provides radiation to the conducting element at one end, and detecting means for sensing radiation transmitted by the conducting element is positioned at the end of the conducting element opposite to the source of radiation and provides an output signal responsive to the intensity of the sensed radiation. The conducting element is transparent to radiation, has an index of refraction which is greater than that of the liquid which is to have its level measured, and has contoured regions on at least a portion of its surface. The contoured regions have an inclination which provides radiation impinging thereon from the source with an angle of incidence which is not greater that the critical angle characterizing the liquid interfaced regions, and which angle is greater than the critical angle characterizing regions which are not interfaced with the liquid, whereby the liquid interfaced regions refract radiation and the regions which are not interfaced with the liquid reflect radiation impinging thereon from the source, and the intensity of the radiation received by the detecting means is a function releated to the level of liquid between the ends of the conducting element.

23 Claims, 9 Drawing Figures

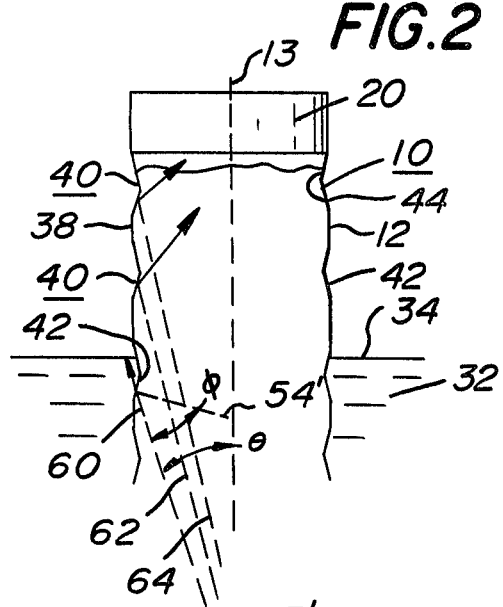
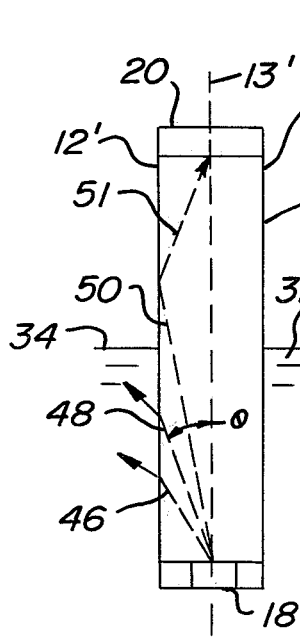
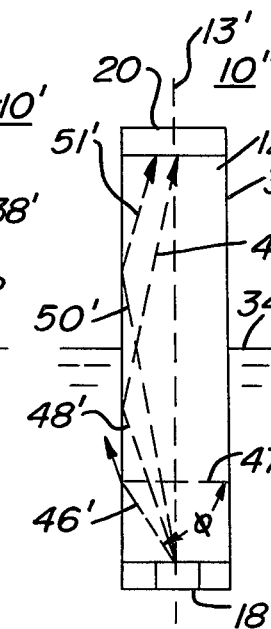
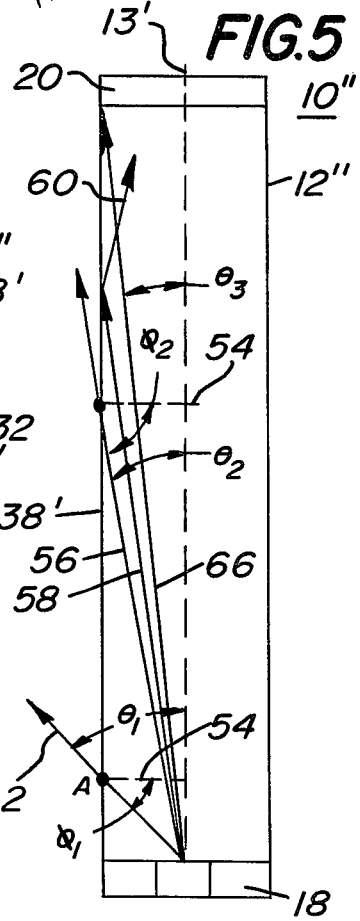

LIQUID LEVEL SENSING MEANS

The invention relates to a liquid level sensing means for providing a continuous indication of liquid level or content of a container, and more particularly to a continuous liquid level sensing means utilizing an elongated light conducting element.

Heretofore liquid level sensing means have been provided utilizing light conducting elements. However, such sensing means have detected the liquid level at only one or several discrete levels. Such devices, therefore have not provided a continuous indication of liquid level or content of a container as the quantity of liquid therein increases or decreases.

A principal object of the invention therefore is to provide a new and improved liquid level sensing means which continuously senses the level of a liquid or the liquid content of a container.

Another object of the invention is to provide a new and improved liquid level sensing means providing a continuous indication of liquid level or the liquid content of a container by utilizing a light conducting element.

Another object of the invention is to provide a new and improved liquid level sensing means which continuously indicates liquid level or liquid content of a container without requiring moving components.

Another object of the invention is to provide a new and improved liquid level sensing means which can be used in connection with various liquid mediums and is resistant to the effects of highly corrosive liquids.

Another object of the invention is to provide a new and improved liquid level sensing means for continuously indicating liquid level or liquid content of a container which is simple in construction and operation.

Another object of the invention is to provide a new and improved continuous liquid level sensing means utilizing a light conducting element having an index of refraction which is greater than that of the liquid which is to have its level measured.

Another object of the invention is to provide a new and improved liquid level sensing means which accurately indicates liquid level or content, is highly reliable, and is durable.

Another object of the invention is to provide a new and improved continuous liquid level sensing means which may be easily and inexpensively manufactured and requires minimum maintenance over an extended period of time.

The above objects as well as many other objects and advantages of the invention are achieved by providing a liquid level sensing means comprising an elongated light conducting means adapted for being received into a liquid. The conducting means has first and second ends and a surface providing an interface with the liquid for measuring liquid levels between the ends of the conducting means. A source provides radiation to the conducting means at its first end, while a detecting means senses the radiation transmitted by the conducting means to its second end and provides an output signal responsive to the intensity of received radiation. The conducting means is of a material such as plastic or glass which is transparent to the transmitted radiation and has an index of refraction which is greater than that of the liquid which is to have its level measured.

At least a portion of the surface of the conducting means is contoured to provide regions therealong between the ends of the conducting means for being impinged by conducted radiation. The regions have inclinations which provide radiation impinging thereon from the source with angles of incidence which are not greater than the critical angle characterizing the liquid interfaced regions, and which angles are greater than the critical angle characterizing regions which are not interfaced with the liquid. This results in the refraction of radiation impinging the regions which are interfaced by the liquid, and the reflection of radiation from the source which impinges regions which are not interfaced with the liquid. The intensity of radiation received by the detecting means provides an output signal by the detecting means which is a function related to the level of the liquid between the ends of the conducting means.

The regions for refracting or reflecting light impinging thereon from the source may be provided by notches, grooves or ridges in the light conducting means which are discrete, annular, spiral or helical in configuration, or by other equivalent means. The annular grooves or ridges along the outer surface of the conducting means which may be in the form of an elongated rod, can be spaced or enlarged for producing an output signal which is a desired function of the liquid level or liquid content of the container. The pitch or depth of spiral or helical grooves at locations along the length of the rod may also vary to provide desired functions of the liquid level or content and the output signal of the detector. Thus, for a container having an irregular configuration, the output signal of the detector may be adjusted to provide a signal which is related to the content of the container for the various levels of the liquid therein.

Figure 7:
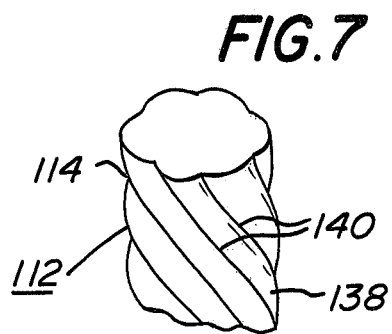
Figure 8:
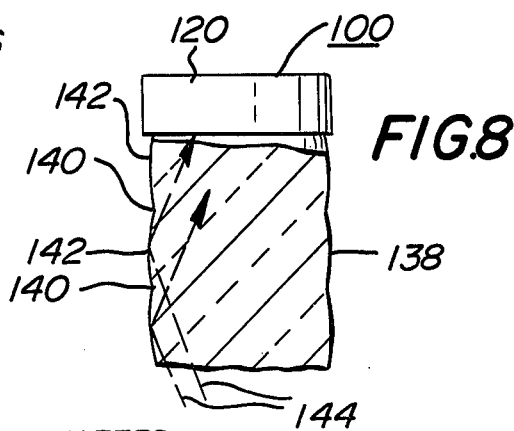
Figure 9:
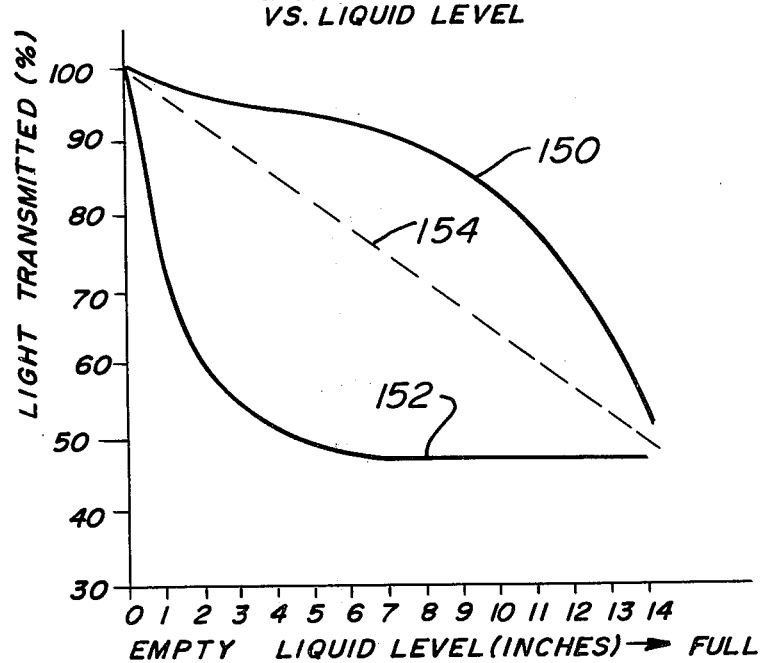

The above objects as well as any other objects of the invention will become more apparent when the following description is read in conjunction with the drawing, in which:

FIG. 1 is a sectional view of a container which includes a level sensing means embodying the invention, FIG. 2 is an enlarged view partially in section of the top portion of the liquid level sensing means shown in FIG. 1, FIG. 3 is a diagramatic illustration of a continuous liquid level sensing means having an index of refraction with a value intermediate that of air and of the liquid which is to have its level measured, FIG. 4 is a diagramatic illustration of a liquid level sensing means embodying the invention having an index of refraction which has a value which is greater than that of the liquid which is to have its level measured, FIG. 5 is an enlarged view similar to that of FIG. 4 for illustrating the respective critical angles for the liquid interfaced and air interfaced regions of the light conducting element, FIG. 6 is a sectional view of a container which includes a level sensing means which is a modified form of the sensing means shown in FIG. 1, FIG. 7 is a perspective view of the top portion of the light conducting element of the level sensing means shown in FIG. 6, FIG. 8 is an enlarged view of the top portion of the level sensing means shown in FIG. 6 with a portion in section of the light conducting element, and FIG. 9 is a graphic illustration of the percentage of the total radiation transmitted to the detecting means of a level sensing means of the type having spiral grooves in its outer surface as shown in FIG. 6 as a function of liquid level.

FIGS. 1 and 2 illustrate a level sensing means 10 for continuously providing an indication of liquid level or the liquid content of a container. The means 10 which is adapted for being received within a liquid container 11, comprises an elongated light conducting element 12 which may be in the form of a rod extending along an axis 13 and having a top end 14 and a bottom end 16. The conducting means may be of a plastic or glass material which transmits radiation such as light or infrared radiation, and has an index of refraction with a value which is greater than that of the liquid 32 which is being measured. The bottom end 16 of the conducting element 12 is secured with a source of radiation 18, which provides radiation for transmission by the light conducting element 12 towards its top end 14. The source 18 of radiation may be a light emitting diode which is energized by an external electrical source over electrical wires 24, it may be replaced by light delivered over a fiber optic guide which connects to the end 16 of the light conducting element 12 and derives light from a remote source which avoids the requirement for electrical energization at the end 16 of the light conducting element 12. The top end 14 has secured to it a light detector 20 which senses radiation transmitted from the source 18 along the light conducting element 12 towards its end 14. The light detector 20 which may be a semiconductor photosensing device, provides an electrical output signal to an output line 22 corresponding to the amplitude or intensity of the radiation sensed by the detector 20. The detector may also be remotely located and receive radiation from the top end 14 of the conducting means through a fiber optic guide.

The liquid container 11 has side and bottom walls 26 and 28, and a top cover 30, which is provided with a filler tube and cap 36. The light conducting element 12 is received within the container 11 with its end 16 proximate to the bottom wall 28 and its top end 14 extending upwardly towards the top cover 30. The conducting element 12 may have its bottom end 16 secured with the bottom wall 28 of the container 11 or retained in any other suitable manner for being immersed within a liquid 32 stored in the container 11 to measure the level 34 of the liquid 32 between the top and bottom ends 14 and 16 of the element 12. The container 11 is preferably made of a material which is light proof and has an external vent for the air space 35 within the container 11 above the level 34 of the liquid 32. Such a vent may be provided in a conventional manner by the filler tube and cap 36 on the cover 30.

The outer wall 38 which may have a generally cylindrical form between the ends 14 and 16 of the light conducting element 12, is provided with a plurality of contoured regions which may be formed by a plurality of ridges or grooves 40 (FIG. 2). The ridges or grooves 40 are annular and spaced from each other along the element 12. Each groove 40 can be V-shaped with a portion 42 providing a contoured region which is angled toward the source 18 of radiation, and a portion 44 which is angled away from the source of radiation 18. The effect of the grooves 40 and their spacing along the rod 12 will be considered in greater detail in connection with the FIGS. 2 and 5.

The level 34 or amount of the liquid 32 within the container 11 is indicated by the output signal delivered on line 22 from the radiation detector 20. In operation, as the level of liquid 32 in the container 11 rises immersing therein a greater portion of the light conducting element 12, a smaller fraction of the light emitted by the source 18 reaches the detector 20 resulting in a corresponding smaller output signal on its line 22. With a decrease in the liquid level 34 or liquid content of the container 11, the percentage of light sensed by the detector 20 from the source 18 increases, resulting in a corresponding increase in the output signal. The output signal, thus, corresponds to and indicates the liquid level or liquid content of the container 11.

For a better understanding of the operation of the invention reference is made to FIG. 3 which diagrammatically illustrates a liquid sensing means 10′ similar to the means 10, except that its light conducting element 12′ has a cylindrical outer wall 38′ which does not have grooves 40 providing contoured regions, and is made of a material having an index of refraction which has a value which is intermediate to those of the liquid 32 which is to have its level 34 measured, and the air in the space above the liquid level 34. As an example, consider the case in which the index of refraction of the material of the rod 12′ has a value of 1.34, which is intermediate that of gasoline having a value of 1.38 and air whose index of refraction is 1.0003.

Radiation, such as light provided by the source 18, is transmitted upwardly at various angles $\theta$ to the longitudinal axis of symmetry 13′ of the light transmitting element 12′. The respective rays 46 and 48 of light shown by the dashed lines in FIG. 3 impinge the cylindrical outer surface 38′ at a location which is interfaced with the liquid 32 and are bent and refracted at the interface into the liquid 32. Such rays are not delivered by the conducting element 12′ to the light detecting means 20. The light is refracted when it passes from a medium with a lower index of refraction into one with a higher index. On the other hand, a ray 50 of light shown by the dashed line from the source 18, which impinges the outer surface 38′ at a location above the liquid level 34, is internally reflected as indicated by the dashed line 51 towards the light detecting means 20. This occurs because the surface 38′ is interfaced with air which has an index of refraction lower than that of the conducting element 12. Thus, as the liquid level 34 rises, more of the radiated light is refracted and less is reflected towards the detector 20. This results in a decrease in the intensity of light sensed and of the output signal provided by the detector 20. With a decrease in the level 34, less light is refracted, while more is reflected from the enlarged upper surface 38′ which is not immersed in the liquid 32. This results in a greater percentage of total emitted light being received by the detector 20, and an increase in the output signal.

Although the level detecting means 10′ operates to provide an output signal which is responsive to the level 34 of the fluid 32, there are few, if any transparent materials with low enough indexes of refraction for use with liquids such as gasoline. For example, FEP, a florinated hydrocarbon, which is reported to have a low index of refraction with a value of 1.34, is translucent rather than transparent. For this reason, it is desirable to provide a continuous level sensing means, which can utilize available transparent light conducting means having higher indexes of refraction for achieving the desired results.

FIGS. 4 and 5 are diagramatic illustrations of a level detecting means 10″ which is similar to the detecting means 10′ of FIG. 3, except that the light conducting element 12″ is made of a transparent material with an index of refraction having a value which is greater than that of the liquid 32. The level detecting means 10″, thus is similar to the detecting means 10 which also is provided with a light conducting element having an index of refraction with a value which is greater than that of the liquid which is to be measured. The rays 46', 48' and 50', of radiation illustrated by dashed lines of FIG. 4, emanating from the source 18 are refracted or reflected depending upon certain conditions which will be considered. The ray 46' impinges the surface 38' at a location where the surface 38' is interfaced with the liquid 32. The ray 46' will be refracted into the liquid 32 or reflected by the wall 38' depending upon whether its angle of incidence $\phi$ to the surface 38' is smaller than or greater than the critical angle $\phi_{c1}$ characterizing the liquid interface. If the angle of incidence $\phi$ of the ray 46', which is measured with respect to a line perpendicular to the surface 38' at the location of impingement exemplified by the dashed line 47, is less than the critical angle $\phi_{c1}$, refraction takes place as illustrated in FIG. 4. As shown in connection with the ray 48', where the angle of incidence $\phi$ is greater than the critical angle $\phi_{c1}$, internal reflection takes place at the surface 38'. The reflected ray 49 is illustrated by the dashed line which impinges upon the detector 20. Similarly, the ray 50' which impinges the surface 38' of the element 12" at a location above the water level 34, and has an angle of incidence $\phi$ which is greater than the critical angle $\phi_{c2}$ characterizing the surface 38' interfaced with air is also reflected by surface 38' and its reflected ray 51' is received and sensed by the detector 20.

The level sensing means 10" differs from the means 10' of FIG. 3, in that when the liquid level 34 is high, with most of the element 12" immersed therein, rays which impinge the surface 38' of the rod 12" with an angle of incidence $\phi$ greater than the critical angle $\phi_{c1}$ are reflected by the surface 38', even if the location of impingement is interfaced with the liquid 32. In contrast, the level sensing means 10' refracts all rays which impinge the surface 38' at locations which are interfaced by the liquid 32. The use of the light conducting element 12" providing an index of refraction having a value greater than that of the liquid 32, thus, results in delivery of radiation to the detector 20 which is not accurately responsive to the liquid level 34 at higher liquid levels.

A more detailed description of the optical characteristics of the liquid level detecting means 10" is provided in connection with FIG. 5 which diagramatically illustrates the level sensing means 10" in enlarged form. The critical angle $\phi_c$ for light traveling in a transparent medium is given by:

$$\sin \phi = N_1/N_2$$

where $N_1$ represents the index of refraction for the external medium interfacing the light transmitting element 12", and $N_2$ represents the index of refraction of the light conducting element 12". If for example, the liquid is gasoline having an index of refraction of 1.38, and the light conducting element 12" has a higher index of refraction of 1.4, the critical angle $\phi_{c1}$ for the liquid interface is obtained from:

$$\sin \phi_{c1} = (1.38/1.4) = 0.9857$$

$$\phi_{c1} = 80°$$

However, when the light conducting element 12" is interfaced by air having an index of refraction of 1.0003, the characterizing critical angle $\phi_{c2}$ is derived from:

$$\sin \phi_{c2} = (1.0003/1.4) = 0.7145$$

$$\phi_{c2} = 45.6°$$

FIG. 5 illustrates by an arrow, a ray 52 of radiation from the source 18, having an angle $\theta_1$ with respect to the center line 13' of the light transmitting element 12", which impinges the surface 38' at a location A. If the angle $\theta_1$ is 44.4°, the ray 52 has an angle $\phi_1$ of incidence of 45.6° with respect to the line 54 normal to the surface 38'. For the example given, this is the critical angle $\phi_{c2}$ for the light transmitting element 12" when interfaced with air. Thus, for angles $\theta$ greater than 44.4°, the angle $\phi$ will be less than the critical angle $\phi_{c2}$ and impinging radiation will be refracted into the air. For radiation with angles $\theta$ less than 44.4°, the angle of incidence will be greater than the critical angle $\phi_{c2}$ and the ray will be internally reflected in the direction towards the detecting means 20. Thus, the point A is the location on the element 12" where the ray 52 impinges with an angle of incidence $\phi$ equal to the critical angle $\phi_{c2}$ of 45.6°, and below which light is refracted and above which it is reflected for the air interface.

The ray 56 of radiation from the source 18, shown by the arrow in FIG. 5, has an angle $\theta_2$ with the center line 13' equal to 10°, and impinges the surface 38' of the element 12" at location B. The angle of incidence $\phi_2$ of the ray 56 is equal to 80°. This is the critical angle $\phi_{c1}$ for the interface of the surface 38' of the element 12" with the liquid gasoline which has the index of 1.38. For rays having an angle $\theta$ greater than 10°, their angles of incidence are less than the critical value $\phi_{c1}$ for the liquid interface, and therefore, are refracted into the liquid. Such rays impinge the surface 38' at locations below the location B. For rays which have an angle $\theta$ of less than 10° and impinge at locations above the point B, their angles of incidence $\phi$ are greater than the critical angle $\phi_{c1}$ for the liquid interfaced surface, and therefore, are internally reflected by the surface 38' of the element 12".

Thus, for locations of impingement above the point B, rays from the source 18 have an angle $\theta$ less than 10° and are reflected, whether or not the location of impingement is interfaced with liquid or air. Therefore, ray 58 which has an angle $\theta$ of less than 10° and impinges the surface 38' at a location above the location B with an angle of incidence $\phi$ greater than the critical angle $\phi_{c1}$, is always reflected as shown by a ray 60, whether or not the surface is interfaced by liquid or air. This results in the level sensing element 10" being non responsive to liquid levels above the location B, since the rise in level does not effect the amount of radiation received and sensed by the detector means 20. The level sensing means 10" of FIGS. 4 and 5, thus, does not accurately indicate liquid levels for those above the point B on the element 12".

The liquid level sensing means 10 of the invention illustrated in FIGS. 1 and 2 differs from the means 10" of FIGS. 4 and 5 by providing the contoured regions 40 over at least a portion of the element 12 proximate to its top 14 and above the location corresponding to the point B in FIG. 5, for overcoming the inability of the level sensing means 10" to continuously indicate liquid level above that location.

In the operation of the level sensing means 10, rays of radiation from a source 18 having angles $\theta$ with the center line 13 of less than 10° impinging the contoured regions of the light transmitting element 12, are refracted or reflected responsive to the level 34 of the liquid 32. This result is achieved by the portions 42 of the grooves 40 in the surface 38 providing the contoured regions. The portion 42 is inclined so that the ray 60 shown in FIG. 2 impinges it with an angle of incidence $\phi$ with respect to line 54' normal to the portion 42 which is less than the critical angle $\phi_{c1}$ characterizing the interface with liquid, and greater than the critical angle $\phi_{c2}$ characterizing its interface with air. The ray 60 is, thus, either refracted or reflected, respectively depending upon whether the region is interfaced by liquid or air. Since the ray 60 impinges the region 42 which is interfaced with liquid, it is refracted into the liquid as illustrated in FIG. 2.

With respect to the rays 62 and 64 of FIG. 2, which have decreasing angles $\theta$ and impinge portions 42 of respective contoured regions located above the liquid level 34, the air interface results in the reflection of the radiation towards the detector 20. Thus, even at the upper end of the light conducting element 12', the contoured regions which are angularly inclined toward the radiation from the source 18, allow refraction and reflection of radiation responsive to the interfaces with liquid and air. The liquid level sensing means 10, thus, effectively provides an output signal by its detector 20 which continuously indicates fluid levels between its ends, except for rays at its lower end having an angle $\theta$ greater than 44.4° or an angle of incidence less than the critical angle $\phi_{c2}$ for the interface of the element 12 with air as described in connection with FIG. 5.

Since radiation from the source 18' which emanates with an angle $\theta$ greater than the critical angle $\phi_{c2}$ for the interface with air is not useful, the light source 18 may be mounted to direct light along the element 12 so that light rays impinge with angles of incidence which are greater than critical angle $\phi_{c2}$ for the interface of the element 12 with air. It is also noted from FIG. 5, that the ray 66 from the source 18 with an angle $\theta$ to the axis 13 less than the angle $\theta_3$, impinges directly upon the detector 20, and also is not effected by the level of the liquid in which the sensing means 10 is immersed. Such directly sensed radiation provides a constant background signal. If desired, this background signal can be eliminated, by providing a slight curvature to the light conducting element 12 preventing the receipt of such radiation by the detector 20 without reflection from the surface 38.

The portions 42 of the grooves 40, as stated above, provide contoured regions having an inclination so that the angle of incidence $\phi$ for radiation from the source impinging thereon is smaller than the critical angle $\phi_{c1}$ for the interface with liquid, and greater than the critical angle $\phi_{c2}$ for the interface with air. For the case, illustrated in FIG. 5, where the critical angle $\phi_{c1}$ for the liquid interface is 80° and the angle $\theta_2$ is 10°, an inclination of the portion 42 of the groove 40 of up to 10° with respect to the longitudinal axis 13 would be suitable. The inclinations of the portions 42 of the contoured regions, need not all be the same, but may vary from a smaller value to a larger value at locations along the rod 12. Thus, as the angle of incidence of a ray decreases for impingement at regions closer to the top 14, the inclination of the portions 42 of the grooves 40 can increase in a complimentary manner for locations displaced towards the top 14 of the conducting means 12. Although angles greater than 10° may be utilized, the angle of inclination of the portions 42 should be minimized to assure reflection of light in the upward direction toward the detector 20. Too large an inclination of the portions 40 could result in an ineffective transmission of light, where it is not reflected upwardly but is deflected downwardly towards the source of radiation.

The other portions 44 of the grooves 40 are conditioned to minimize the return therethrough of light refracted by the portion 42. As clearly shown in FIG. 2, the portion 44 is angularly disposed so that light refracted from the portion 42 is deflected away from the surface 44. This avoids receipt of refracted light back into the light conducting means 12. Other means may also be provided to prevent refraction of light from the liquid into the light conducting means 12 through the portion 44 as by coating its surface with a light absorbing or reflecting material.

Of course, a coating or conditioning of the portion 42 of the conducting means 20 which inhibits or prevents the defraction of light from the source 18 into the liquid 32 is undesirable. Such a coating could be formed by dirt or other particles settling on the surface 38 of the light conducting means 12 depending upon the type and condition of the liquid into which the level sensing means 10 is immersed. The adverse effect of such a coating may be minimized by utilizing a source 18 which provides infrared radiation. In that case, the detector 20 would be of a type which is sensitive to such radiation. Because infrared radiation is more readily transmitted through coatings of sediment which may be deposited on the surface 38 of the element 12, the liquid level sensing means can continue to operate satisfactorily under such adverse operating conditions. The use of infrared radiation may also be of advantage where the container 11 is subject to receipt therein of outside illumination. Since the detector 20, may be made to sense only the infrared radiation, radiation in the light frequency spectrum will not materially effect the operation of the sensing means. Of course, where the use of an infrared radiation source is not desired, the source 18 may provide radiation of a desired particular frequency or band of frequencies for operation of the level sensing means 10.

Since the intensity of radiation sensed by the detector 20 of the sensing means 10 is a function of the liquid level 34 in which the sensing means 10 is immersed, the output signal of the detector 20 will also be a function of the liquid level 34. The amount or intensity of radiation received by the detector 20 is also a function of the contoured regions provided by the portions 42 and their location along the length of the light transmitting element 12. Because of this, the relationship between the output signal of the detector 20 and the level 34 of the liquid 32 are effected by the number and spacing of the annular grooves 40 along the length of the element 12. The spacing and number of grooves 40 may be such that the output signal of the detector 20 is linearly related to the level 34 of the liquid 32. Where desired, a non linear relationship may also be provided. Thus, where the container 11 has a capacity which does not increase linearly with the level 34 of the liquid 32 contained therein, the same non linear relationship may be provided by the spacing and number of grooves 40 along the light conducting element 12, so that the output signal 20 indicates the liquid content of the container 11. In this manner, the liquid level sensing means 10 not only is capable of indicating the level 34 of liquid, but may also provide an indication of the content of the container 11. Such a content indication rather than of liquid level, may be of greater significance, especially where it is used for showing the amount of fuel in the tank of an automobile, airplane or other craft.

The liquid level sensing device 10, is of great utility since it is not dependent upon the mechanical functioning and movement of floats or other movable means commonly used for indication of liquid level or the content of a container. The materials utilized are generally resistant to the deteriorating effects of liquid, since the light conducting means, the radiation source and detector can be made of plastic, glass or like materials which are highly resistive to acids, bases and other chemical substances, which may be highly corrosive to metal and other such materials.

The level sensing means 10 is also operative when the radiation detector 20 is positioned at the bottom of the light conducting element 12, and the radiation source 18 is located at its top 14. With this arrangement, radiation from the source which impinges upon the surface 38 which is interfaced by air, is reflected downwardly toward the detector 20, while radiation impinging the surface 38 having a liquid interface is refracted into the liquid. As the liquid level rises, more of the radiation which is transmitted downwardly is refracted so that less is sensed by the detector 20, while as the level is lowered, a larger proportion of the light is reflected downwardly and sensed by the detector 20. On the same basis, the inversion of the container 11 will not render the liquid level sensing device 12 inoperative, since it will continue to operate as in the situation where the detector 20 and radiation source 18 are interchanged.

FIGS. 6, 7 and 8 illustrate a liquid level sensing means 100 which is a modified form of the sensing means 10, which is positioned within a liquid container 11' similar to the container 11. Because of the similarities between the liquid level sensing means 100 and the liquid level sensing means 10 of FIG. 1, a description will be provided in detail only of their differences.

The liquid sensing means 100 has a light conducting element 112 which receives radiation from a radiation source 118 secured at its bottom 116, for transmission therealong to a radiation detector 120 at its top 114. The light conducting element 112 which is elongated has an outer wall or surface 138 which is substantially cylindrical in form. The surface 138 has a plurality of spiral or helical grooves 140 extending from the top 114 to its bottom 116 of the conducting means 112. In longitudinal cross-section as shown in FIG. 8, the grooves 140 are each formed between pairs of arcuate surface portions 142. The arcuate portions 142 provide the wall 138 with curved surfaces which are interfaced with the surrounding air or liquid. Radiation rays 144 from the source 118, illustrated by the dashed lines in FIG. 8, impinge upon the curved surfaces 142. The curved surfaces 142 provide regions which are inclined towards the radiation source 118 so that rays of the impinging radiation have angles of incidence $\phi$ which are less than the critical angle $\phi_{c1}$ for the liquid interface and greater than the critical angle $\phi_{c2}$ for the air interface. Thus, such curved or contoured regions of the surface 138 with such inclinations refract or reflect radiation impinging thereon from the source 118, depending upon whether the regions are interfaced with liquid or air.

The light conducting element 112 with the spiral grooves 140, thus, operates in a manner similar to that described in connection with the level sensing means 10 having annular grooves. The spiral or helical grooves 40 in the wall 138 of the light conducting element 112 are interspaced with respect to each other. The pitch or depth of the grooves 140 may be constant, or vary in value, by having different values at various locations along the length of the element 112. The effects obtained by varying the pitch of the spiraled grooves 140 are described in connection with the curves in the graphic illustration of FIG. 9.

The curve 150 of FIG. 9 represents the percentage of total light transmitted by the conducting element 112 as a function of the liquid level of a container utilizing a level sensing means of the type shown in FIG. 6 with a spiraled light conducting element 112. The light conducting element was made of a one-quarter inch pyrex rod having an index of refraction with a value of approximately 1.48, and was immersed in water with a index of refraction having a value of 1.33. The liquid level varied between 0 and 14 inches in height, and the level sensing element was shielded from external sources of light. For the curve 150, the grooves 140 had a variable pitch, being tightly wound at the top end with approximately one turn per inch, and more loosely wound at the bottom end having approximately one-half turn per inch. The curve 150 shows a non linear variation of the output signal with the increase of the liquid level.

The curve 152 is for a light conducting element which has grooves 140 which are loosely wound at the top and tightly wound at the bottom in the manner described in connection with the conducting means providing the curve 150. The curve 152 is also non linear showing a rapid initial decrease in the output signal with increase in the liquid at a low level, which distinguishes it from the slow decrease in output signal for an increase in the liquid at the same low levels for the curve 150. The dashed line 154 of FIG. 9 illustrates a linear relationship between the light transmitted and the liquid level which provides a corresponding linear output signal. Such a linear output signal, and other variations of non linear output signals, can be provided by varying the pitch of the grooves 140 at different locations along the length of the light conducting element 112.

Under conditions where the level of a liquid corresponds directly to the content of the container, a signal which varies linearly with the level of the liquid is desirable for showing fluid content. However, where the container is irregular so that the contents of the liquid varies non linearly with change in liquid level, the liquid level sensing means may be provided with an output signal which correspondingly varies non linearly with the liquid level for providing an output signal correctly representing the liquid content of the container. Similar results may also be obtained with the use of spaced annular grooves and other such means.

While only a few representative embodiments of the invention are disclosed herein in detail, it will be obvious to those skilled in the art, that there are many modifications and variations accomplishing the foregoing objects and realizing many or all of the advantages, but which yet do not depart essentially from the spirit of the invention.

What is claimed is:

1. A liquid level sensing means for providing a continuous indication of liquid level comprising an elongated light conducting means adapted for being received into a liquid having first and second ends and a surface which provides an interface with the liquid for measuring liquid levels between the ends of the conducting means, a source providing radiation to the conducting means at its first end, and detecting means for sensing the radiation transmitted by the conducting means to its second end and providing an output signal, the conducting means being transparent to the radiation and having an index of refraction greater than that of the liquid which is to have its level measured, at least a portion of the surface of the conducting means being contoured to provide regions therealong between the ends of the conducting means with an inclination which provides radiation impinging thereon from the source with an angle of incidence which is not greater than the critical angle characterizing the liquid interfaced regions and which is greater than the critical angle characterizing regions which are not interfaced with the liquid, whereby the liquid interfaced regions refract radiation and the regions which are not interfaced with the liquid reflect radiation impinging thereon from the source, and the intensity of the radiation received by the detecting means is a function related to the level of the liquid between the ends of the conducting means.

2. The sensing means of claim 1 in which the conducting means is a rod having the first and second ends at its bottom and top respectively, the source of radiation provides light at the bottom end for conduction by the rod, and the rod has the contoured regions at least along a portion of its length proximate to its top end.

3. The sensing means of claim 2 in which the contoured regions of the surface of the rod are inclined to reduce the angle of incidence of the light from the source.

4. The sensing means of claim 3 in which the surface of the rod between its ends provides an outer wall with at least one groove therein for providing the contoured regions.

5. The sensing means of claim 4 in which a plurality of grooves are provided in the surface of the rod each with a cross-section providing a first surface for intercepting light from the source and reflecting same for transmission along the rod toward the second end when not interfaced with the liquid and refracting light into the liquid when interfaced with the liquid, and a second surface conditioned to reduce receipt therethrough into the rod of light which is refracted into the liquid by the first surface.

6. The sensing means of claim 5 in which the grooves in the surface of the rod have a V shaped cross-section for providing the first and second surfaces.

7. The sensing means of claim 5 in which the grooves in the surface of the rod have an arcuate cross-section for providing the first and second surfaces.

8. The sensing means of claim 4, 5, 6 or 7 in which the grooves in the surface of the rod are annular in configuration and spaced from each other.

9. The sensing means of claim 4 in which a plurality of grooves are provided in the surface of the rod, and the grooves are annular in configuration and spaced along the rod to provide an output signal by the detecting means which is a predetermined function of the liquid level being measured.

10. The sensing means of claim 9 in which the output signal of the detecting means has a substantially linear relationship to the level of the liquid being measured.

11. The sensing means of claim 4 in which the groove in the surface of the rod is spiral in configuration.

12. The sensing means of claim 11 in which the pitch of the spiral groove has values at locations along the rod for providing an output signal by the detecting means which is a predetermined function of the liquid level being measured.

13. The sensing means of claim 12 in which the output signal of the detecting means has a substantially linear relationship to the level of the liquid being measured.

14. The sensing means of claim 4 in which the groove in the surface of the rod has a cross-section providing a first surface for intercepting light from the source and reflecting same for transmission along the rod toward the second end when not interfaced with the liquid and refracting light into the liquid when interfaced with the liquid, and a second surface conditioned to reduce receipt therethrough into the rod of light which is refracted into the liquid by the first surface.

15. The sensing means of claim 14 in which the groove in the surface of the rod has a V shaped cross-section for providing the first and second surfaces.

16. The sensing means of claim 4 in which the groove in the surface of the rod has an arcuate cross-section with a portion providing a first surface for intercepting light from the source and reflecting same for transmission along the rod toward the second end when not interfaced with the liquid and refracting light into the liquid when interfaced with the liquid, and a second surface conditioned to reduce receipt therethrough into the rod of light which is refracted into the liquid by the first surface.

17. The sensing means of claim 11, 14, 15 or 16 in which a plurality of grooves having the spiral configuration are provided in the surface of the rod between its ends in interspaced relationship to each other.

18. A liquid level sensing means for providing a continuous indication of the liquid content comprising a container for liquid, sensing means including an elongated light conducting means secured within the container having first and second ends and a surface between its end for being gradually immersed in the liquid with the rise of the liquid level to provide an interface with the liquid for measuring liquid levels between the ends of the conducting means, a source providing radiation to the rod means at its first end, and detecting means for sensing the radiation transmitted by the conducting means to its second end and providing an output signal, the conducting means being transparent to the radiation and having an index of refraction greater than that of the liquid which is to have its level measured, at least a portion of the surface of the conducting means being contoured to provide regions therealong between the ends of the conducting means with an inclination which provides radiation impinging thereon from the source with an angle of incidence which is not greater than the critical angle characterizing the liquid interfaced regions and which is greater than the critical angle characterizing regions which are not interfaced with the liquid, whereby the liquid interfaced regions refract radiation and the regions which are not interfaced with the liquid reflect radiation impinging thereon from the source, and the intensity of the radiation received by the detecting means is a function related to the level of the liquid between the ends of the conducting means for providing an output signal indicating the liquid content of the container.

19. The means of claim 18 in which the conducting means is a rod having the first and second ends at its bottom and top respectively, the source of radiation provides light at the bottom end for conduction by the rod, and the rod has the contoured regions at least along a portion of its length proximate to its top end with the surface between its ends providing an outer wall with at least one groove therein for providing the contoured regions.

20. The means of claim 19 in which a plurality of grooves are provided in the surface of the rod, and the grooves are annular in configuration and spaced along the rod to provide an output signal by the detecting means which is a predetermined function of the liquid level being measured.

21. The means of claim 20 in which the output signal of the detecting means has a substantially linear relationship to the content of the liquid being measured.

22. The means of claim 19 in which a plurality of grooves are provided in the surface of the rod, and the grooves are spiral in configuration and in interspaced relationship along the rod, and the pitch of each of the spiral grooves has values at locations along the rod for providing an output signal by the detecting means which is a predetermined function of the liquid level being measured.

23. The means of claim 22 in which the output signal of the detecting means has a substantially linear relationship to the content of the liquid being measured.

* * * * *